No. 893,823. PATENTED JULY 21, 1908.
R. L. WATKINS.
COMBINED MICROSCOPE AND CAMERA.
APPLICATION FILED AUG. 14, 1907.

Witnesses

Robert L. Watkins, Inventor
By his Attorneys

UNITED STATES PATENT OFFICE.

ROBERT L. WATKINS, OF NEW YORK, N. Y.

COMBINED MICROSCOPE AND CAMERA.

No. 893,823.  Specification of Letters Patent.  Patented July 21, 1908.

Application filed August 14, 1907. Serial No. 388,485.

*To all whom it may concern:*

Be it known that I, ROBERT L. WATKINS, M. D., a citizen of the United States, and resident of the borough of Manhattan, city, county, and State of New York, have invented certain new and useful Improvements in a Combined Microscope and Camera, of which the following is a specification, accompanied by drawings.

The object of the invention is to provide a combined microscopic camera, which may be conveniently transported and set up to be used either as a microscope or for photographing microscopic objects exposed on its stage. These and certain other features of the invention will be readily understood from the following description of the preferred form of the invention, illustrated in the accompanying drawings, in which,—

Figure 1:
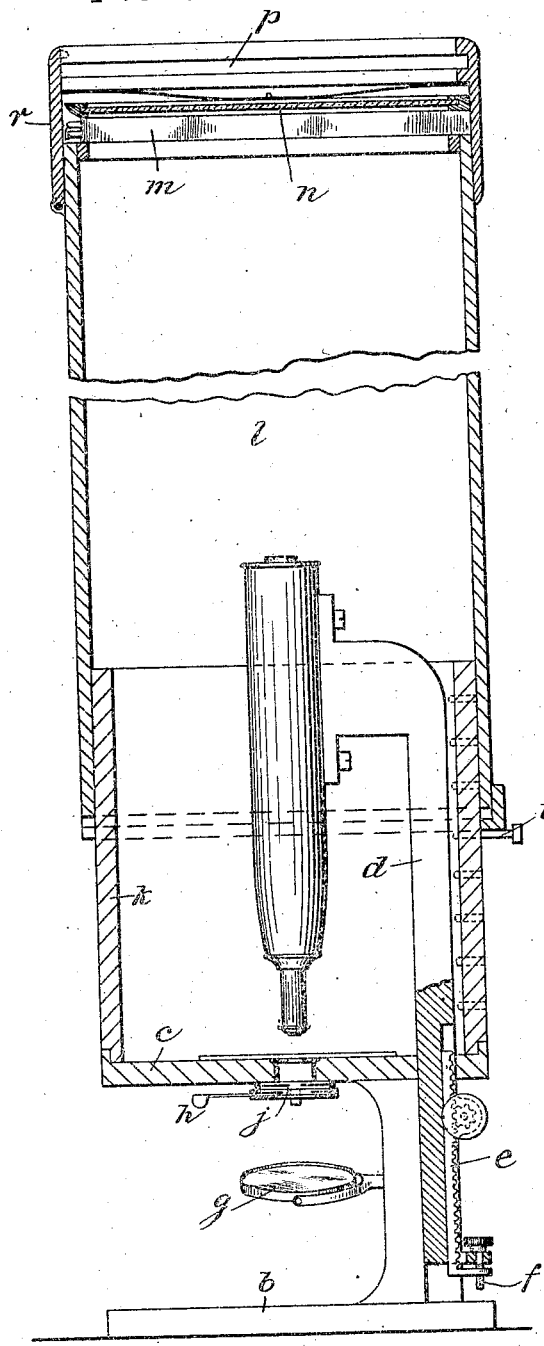
Figure 2:
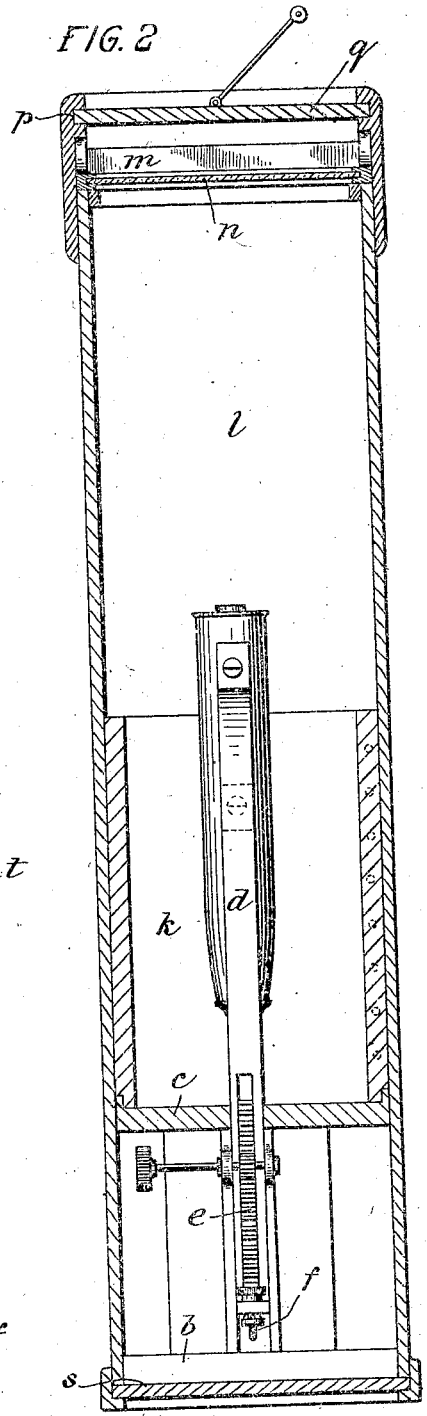

Figure 1 is a side sectional view showing the apparatus set up for use as a camera; and Fig. 2 is a sectional view at right angles showing the parts in position for transportation.

The microscope proper has a base $b$ and stage $c$. The tube of the microscope is mounted on a focusing post $d$, which is adjustable from beneath the stage, so that all above the stage may be included in the dark chamber, and the focusing accomplished from outside thereof. I have illustrated a rack $e$ and pinion for coarse adjustment, and a micrometer screw $f$ for fine adjustment, but other forms of coarse and fine adjustment operable from beneath the stage can be substituted without changing the invention. The reflector $g$ may be of the usual type. Carried and preferably adjusted beneath the stage is a photographic shutter $h$ provided with a diaphragm $j$, which may be of any suitable form, such, for example, as that familiar in Kodak cameras, the minor details of which do not form a part of this invention.

Fitted to the stage by a light tight joint, as shown, is the lower member $k$ of the camera chamber, the stage $c$ forming the bottom wall of the dark chamber. Sliding upon and telescoping over the member $k$ is an outer member or casing $l$, which at its upper end receives the plate holder $m$ and the ground focusing glass $n$. In Fig. 1 the plate holder is shown in position for using the plate, and in Fig. 2 the ground glass $n$ is shown in position for focusing, the plate holder $m$ lying on top when the parts are packed for transportation as in Fig. 2. The cover $q$ having a handle as seen in Fig. 2 for carrying the apparatus is fitted to slide in grooves $p$ in the upper end of the outer casing $l$. A side flap $r$ may be provided for closing the opening through which the plate holder is inserted. The details of the plate holder mounting, and indeed the matter whether plate holders or films are employed are immaterial to my invention.

The casing or outer member $l$ is of such length as to entirely contain the microscope as seen in Fig. 2, and telescopes or slides down upon the member $k$ and over the stage $c$ and base $b$, as seen in Fig. 2, and may be closed at its bottom by a cover $s$, so as to contain all the parts for transportation. When a micro-photograph is to be taken the member $l$ is drawn up to a position, which will bring the ground glass or plates approximately to focusing position, and is held by means of a pin $t$ fitting into any one of a series of pin holes shown in dotted lines in the wall of the member $k$.

The operation of the microscope when it is to be used simply as a microscope can be understood without description. The eye piece and the object lens are selected and the focusing accomplished in the usual way, the members $k$ and $l$ being entirely removed. When used for taking photographs, however, the members $k$ and $l$ are in place and the focusing accomplished upon the ground glass and then the plate holder is inserted. The shutter being closed and the plate holder open, the photograph may now either be taken by time exposure or instantaneously. When it is desired to close the apparatus for transportation the pin $t$ is drawn out and the casing or member $l$ slid down to close the entire apparatus. The cover or slide $s$ is inserted at the bottom and the cover $q$ at the top, whereupon it will be seen that the instrument is entirely inclosed.

Such an apparatus enables the physician to conveniently make micro-photographs of blood or any other object while calling upon a patient as well as to make a microscopic examination without photograph.

It will be understood that the details can be widely varied without affecting the principles of the invention.

I claim and desire to secure by Letters Patent the following:

1. A combined microscope and microscopic camera, having a microscope with a suitable base and a stage that forms part of the dark chamber, telescoping camera members, one of which fits upon the said stage and another of which forms an outer case and movably fits over the other and over the said stage and base, means for focusing the microscope from beneath the stage, and means for closing the said outer case at its respective ends, for substantially the purposes set forth.

2. In a combined microscope and camera, a microscope having a base and stage and means for focusing from beneath the stage, and a camera chamber, one end of which is formed by the stage, and a part of which is movable and fitted to inclose the entire microscope for transportation, for substantially the purposes set forth.

3. A combined microscope and camera having an outer casing adjustably mounted relatively to the stage of the microscope, and fitted to receive and contain the microscope, and a cover for carrying the microscope and closing the lower end of the outer casing.

4. In a combined microscope and camera, an outer casing adapted to receive and contain the microscope including its stage when not in use, and means for supporting the casing above the stage of the microscope when in use.

5. In a combined microscope and camera, an outer casing adapted to receive and contain the microscope including its stage when not in use, means for supporting the casing above the stage of the microscope when in use, and means for focusing the microscope operable from beneath the stage.

6. In a combined microscope and camera, the microscope having a stage, a dark chamber member removably fitting the stage, a member telescoping over the first said member and over the stage, and means for supporting it, for substantially the purposes set forth.

7. In a combined microscope and camera, the microscope having a stage, a dark chamber member removably fitting the stage, a member telescoping over the first said member and over the stage, and means for supporting it at various positions upon the first said member when in use.

8. In combination with a microscope having a stage for the object to be examined or photographed, a camera chamber and appurtenances therefor removably mounted on the said stage and forming therewith a dark chamber.

9. In combination with a microscope having a stage for the object to be examined or photographed, a camera chamber and appurtenances therefor removably mounted on the said stage and forming therewith a dark chamber, and means for focusing the microscope from beneath its stage.

10. In combination with a microscope having a stage for the object to be examined or photographed, a camera chamber and appurtenances therefor removably mounted on the said stage and forming therewith a dark chamber, and a shutter carried by the stage.

11. In combination with a microscope having a stage and base and means for focusing the microscope, a camera chamber and appurtenances removably mounted upon the said stage and comprising means for adjusting the length of the chamber and holding it in different positions of adjustment independently of the said focusing means.

12. In combination with a microscope having a stage and base and means for focusing the microscope, a camera chamber and appurtenances mounted upon the said stage, and means operable from outside the said chamber for adjusting the portions of the microscope within the said chamber.

In testimony whereof I have signed this specification in the presence of two subscribing witnesses.

ROBERT L. WATKINS.

Witnesses:
OLIN A. FOSTER,
HAROLD BINNEY.